United States Patent [19]
Yeoman et al.

[11] Patent Number: 6,076,813
[45] Date of Patent: Jun. 20, 2000

[54] VAPOR LIQUID CONTACT TRAY WITH TWO-STAGE DOWNCOMER

[75] Inventors: Neil Yeoman, Merrick, N.Y.; Chang-Li Hsieh, Carlisle, Mass.

[73] Assignee: Koch-Glitsch, Inc., Wichita, Kans.

[21] Appl. No.: 09/076,481

[22] Filed: May 12, 1998

Related U.S. Application Data

[60] Provisional application No. 60/046,231, May 12, 1997, abandoned.

[51] Int. Cl.⁷ ................................................ B01F 3/04
[52] U.S. Cl. .................................... 261/114.1; 261/114.5
[58] Field of Search ............................ 261/114.1, 114.5

[56] References Cited

U.S. PATENT DOCUMENTS

| | | | |
|---|---|---|---|
| 2,875,867 | 3/1959 | Hart | 261/114.1 |
| 2,902,413 | 9/1959 | Kassel et al. | 261/114.1 |
| 2,909,414 | 10/1959 | Gerhold et al. | 261/114.1 |
| 4,288,393 | 9/1981 | Sekiguchi et al. | 261/114.1 |
| 4,528,068 | 7/1985 | Fiocco et al. | 196/14.52 |
| 4,954,294 | 9/1990 | Bannon | 261/114.1 |
| 5,213,719 | 5/1993 | Chuang | 261/114.1 |
| 5,593,548 | 1/1997 | Yeoman et al. | 203/29 |
| 5,618,473 | 4/1997 | Sauter et al. | 261/114.1 |

FOREIGN PATENT DOCUMENTS

| | | |
|---|---|---|
| 0 635 292 A1 | 1/1995 | European Pat. Off. . |
| 764103 | 9/1952 | Germany ............................ 261/114.1 |
| 1 801 538 | 6/1970 | Germany . |
| 1025440 | 6/1983 | U.S.S.R. ............................. 261/114.1 |
| 823610 | 11/1959 | United Kingdom . |

*Primary Examiner*—C. Scott Bushey
*Attorney, Agent, or Firm*—Shook, Hardy & Bacon L.L.P.

[57] ABSTRACT

A vapor-liquid contact tray (16) is provided with an upstream downcomer (46) and a downstream downcomer (48) which form a two-stage downcomer. The discharge outlet (62) of the upstream downcomer (46) feeds liquid into the downstream downcomer (48) to help seal the discharge outlet (58) of the downstream downcomer (48) against vapor entry at lower liquid flow rates and to allow positioning of the discharge outlet (58) above the height of the weir (66) on the underlying tray (16). Because the upstream downcomer (46) does not discharge liquid directly onto the underlying tray deck (40), the area of the tray deck (40) underlying the upstream downcomer (46) can contain vapor flow apertures (68) to increase the active area and mass transfer efficiency of the tray (16).

17 Claims, 2 Drawing Sheets

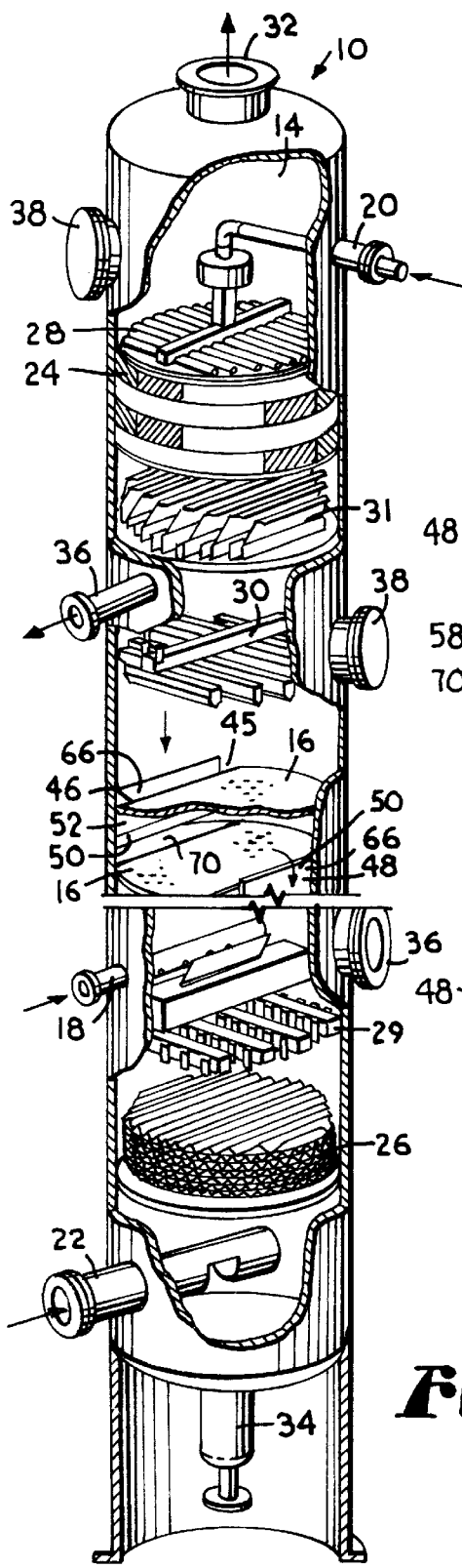
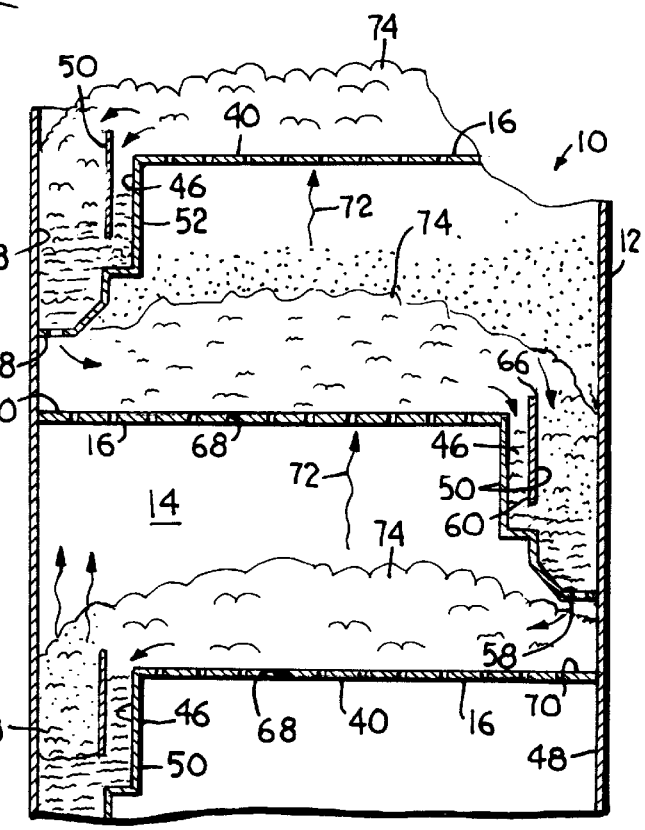
Fig. 2.
Fig. 1.

VAPOR LIQUID CONTACT TRAY WITH TWO-STAGE DOWNCOMER

CROSS-REFERENCE TO RELATED APPLICATIONS

This application claims the benefit of U.S. Provisional Application No. 60/046,231, filed May 12, 1997, now abandoned.

STATEMENT REGARDING FEDERALLY SPONSORED RESEARCH

Not applicable.

BACKGROUND OF THE INVENTION

This invention relates in general to mass transfer columns and, more particularly, to downcomers associated with vapor-liquid contact trays placed within the columns. The invention also relates to methods for using the trays to effect mass transfer between vapor and liquid streams flowing within the column.

Vapor-liquid contact trays are used in mass transfer columns to facilitate interaction and mass transfer between vapor and liquid streams flowing through the column. The trays typically have a tray deck with liquid inlet and outlet ends and an opening formed at the outlet end of the tray deck. A downcomer is positioned at the opening in the tray deck and provides a passage for removing liquid from the outlet end of the tray deck and directing it downwardly to the inlet end of the underlying tray deck. The liquid then flows across the underlying tray and enters the downcomer at the outlet end of that tray deck for passage to the next underlying tray. This pattern is then repeated on each underlying tray.

As liquid is flowing across the tray deck on these vapor-liquid contact trays, vapor passes upwardly through apertures provided in the "active area" of the tray deck and interacts with the liquid to form a frothy two-phase mixture. Most of the vapor then disengages from the mixture and passes upwardly through the apertures in the overlying tray deck. A portion of the vapor, however, remains entrained with the liquid entering the downcomer and passes downwardly to the underlying tray. If this vapor cannot be separated from the liquid in the downcomer, it will limit the liquid handling capacity of the downcomer. Return of vapor to the underlying tray is also generally undesirable in that it limits the mass transfer efficiency of the tray.

The efficiency of a tray can also be reduced by liquid "weeping" or passing downwardly through the vapor apertures in the tray deck rather than flowing completely across the tray deck and interacting with the ascending vapor. Weeping would be particularly problematic in the inlet area of the tray deck underlying the downcomer discharge outlet because the downward force of the liquid exiting the downcomer would force the liquid through the vapor apertures. In order to reduce weeping in this inlet area, apertures are typically omitted from that portion of the tray deck.

One disadvantage to eliminating the vapor apertures from the inlet area of the tray deck is the active area of the tray is reduced, resulting in reduced tray capacity. A number of tray modifications have been utilized or proposed in order to reduce or overcome this disadvantage, including using a sloping downcomer wall to reduce the horizontal cross-sectional area of the downcomer discharge outlet, thereby reducing the size of the inlet area and increasing the active area of the tray deck. However, if the discharge outlet is sized too small, liquid may back up and flood the downcomer, thereby limiting the liquid handling capacity of the downcomer.

In addition to the size of the discharge opening, there are other factors that can affect the liquid handling capacity of the downcomer. One of these factors is known as the downcomer clearance and is the vertical spacing between the downcomer outlet and the top surface of the underlying tray deck. Increases in the downcomer clearance generally result in increases in the liquid capacity of the downcomer. In applications where high liquid flow rates are encountered, it is often desirable to have the downcomer outlet positioned above rather than below the height of the weir or the liquid level on the underlying tray so that liquid can more easily exit the downcomer.

One approach to increasing the liquid handling capacity of a downcomer is disclosed in U.S. Pat. No. 5,213,719 to Chuang. In that patent, a two-stage downcomer consisting of an upstream downcomer and an adjacent downstream downcomer are positioned at the opening in the tray deck. A weir positioned between the downcomers forces liquid to fill the upstream downcomer before it rises above the level of the weir and enters the downstream downcomer. At higher liquid flow rates, this two-stage downcomer was said to accommodate liquid flow rates up to 80% greater than through a single downcomer. One potential disadvantage to this type of downcomer, however, is a partition wall separates the upstream downcomer from the downstream downcomer and liquid entering either downcomer is blocked by the partition wall from passing into the other downcomer. As a result, essentially no liquid is presented to the downstream downcomer until liquid flow rates are high enough to cause liquid to fill the upstream downcomer and accumulate on the tray deck to a sufficient level to overflow the weir. The outlet of the downstream downcomer must thus extend significantly below the liquid level on the underlying tray to seal against vapor bypassing the active area of the tray deck by entering and traveling upwardly through the downstream downcomer. As mentioned above, this reduction in downcomer clearance can reduce the capacity of the downcomer, particularly under high liquid rate conditions. In addition, the liquid discharge from the upstream downcomer is directed vertically downward onto the active area of the tray and can weep through the vapor apertures, thereby bypassing interaction with vapor on the tray deck and reducing the efficiency of the tray. As a result, a need has developed for a high capacity downcomer that does not require that the downcomer discharge outlet be positioned below the weir height on the underlying tray and/or has a lower incidence of liquid weeping.

BRIEF SUMMARY OF THE INVENTION

It is an object of this invention to provide a vapor-liquid contact tray with a two-stage downcomer that allows liquid to pool in an upstream portion of the downcomer to facilitate vapor disengagement from the liquid in an area of the downcomer that normally does not contribute significantly to vapor disengagement.

It is another object of this invention to provide a vapor-liquid contact tray with a two-stage downcomer that feeds liquid from the upstream downcomer into the downstream downcomer to help seal the discharge outlet of the downstream downcomer against vapor entry at lower liquid flow rates, thereby increasing the liquid handling capacity of the downcomer by allowing the discharge outlet to be located above the weir height or liquid level on the underlying tray.

It is a further object of this invention to provide a vapor-liquid contact tray with a two-stage downcomer in which the liquid exiting the upstream downcomer is directed into the downstream downcomer rather than onto the tray deck where its downward force might otherwise cause the liquid to weep through the vapor apertures and reduce the mass transfer efficiency of the tray.

As a corollary to the preceding object, directing the liquid discharge from the upstream downcomer into the downstream downcomer rather than onto the tray deck has the further objective of allowing vapor apertures to be placed in the portion of the tray deck underlying the upstream downcomer to permit that portion of the tray deck to form part of the active area of the tray and thereby increase the vapor handling capacity of the tray.

To accomplish these and other related objects of the invention, in one aspect the invention is directed to a plurality of vapor-liquid contact trays positioned in vertically spaced apart relationship within a mass transfer column. The trays have a tray deck containing an opening for removing liquid from an upper surface of the tray deck and a plurality of apertures for allowing vapor to flow upwardly through the tray deck. An upstream downcomer positioned at the opening in the tray deck extends downwardly toward the underlying tray deck and has an upper inlet to receive at least a portion of the liquid entering the opening from the tray deck and a lower discharge outlet through which liquid exits the upstream downcomer. A downstream downcomer also extends downwardly at said opening in the tray deck and has a lower discharge outlet through which liquid exits the downstream downcomer and is directed onto an underlying vapor-liquid contact tray. A partition wall separates the downstream downcomer from said upstream downcomer along at least a portion of the length of said downstream and upstream downcomers. The discharge outlet of the upstream downcomer is in fluid flow communication with the downstream downcomer to feed at least a portion of the liquid exiting the upstream downcomer into the downstream downcomer rather than directly onto the deck of the underlying tray. In one embodiment, an opening is formed in the partition wall to provide the fluid flow communication between the upstream downcomer and an intermediate or lower portion of the downstream downcomer. In another embodiment, the upstream downcomer is formed as an integral part of the downstream downcomer and discharges liquid downwardly into the surrounding part of the downstream downcomer.

In another aspect, the invention is directed to a method of utilizing the vapor-liquid contact trays to facilitate vapor-liquid interaction, particularly under high liquid flow rate conditions. The upstream downcomer accumulates liquid under normal operating conditions to facilitate vapor disengagement from the accumulated liquid. At higher flow rates, the upstream downcomer fills and the liquid flow capacity of the downstream downcomer is utilized as liquid enters the top inlet of the downstream downcomer, typically after overflowing a weir separating the inlets to the downcomers. The upstream downcomer also discharges liquid into lower regions of the downstream downcomer to help seal against vapor entry even under lower liquid flow conditions.

An advantage of the vapor-liquid contact trays of the present invention is that, by feeding liquid from the upstream downcomer into the downstream downcomer rather than directly to the underlying tray deck, a vapor seal can be formed by the liquid entering the downstream downcomer even at lower liquid flow rates. This allows the discharge outlet on the downstream downcomer to be located above the weir height on the underlying tray, thereby providing greater downcomer clearance and increased liquid handling capacity. In addition, because the liquid exiting the upstream downcomer is not directed directly onto the tray deck, the portion of the tray deck underlying the upstream downcomer can be perforated for vapor passage without the risk of liquid weeping that would otherwise result from liquid discharging directly onto the deck from the upstream downcomer. As a result, the increased active area contributes to greater mass transfer efficiency.

BRIEF DESCRIPTION OF THE SEVERAL VIEWS OF THE DRAWINGS

In the accompanying drawings which form a part of the specification and are to be read in conjunction therewith and in which like reference numerals are used to indicate like parts in the various views:

FIG. 1 is a fragmentary perspective view of a mass transfer column with portions broken away to illustrate the internal placement of a plurality of vapor-liquid contact trays constructed according to the present invention;

FIG. 2 is a fragmentary side elevation view of the column taken in vertical section to schematically illustrate the liquid and vapor flow and interaction on the vapor-liquid contact trays;

DETAILED DESCRIPTION OF THE INVENTION

Figure 3:
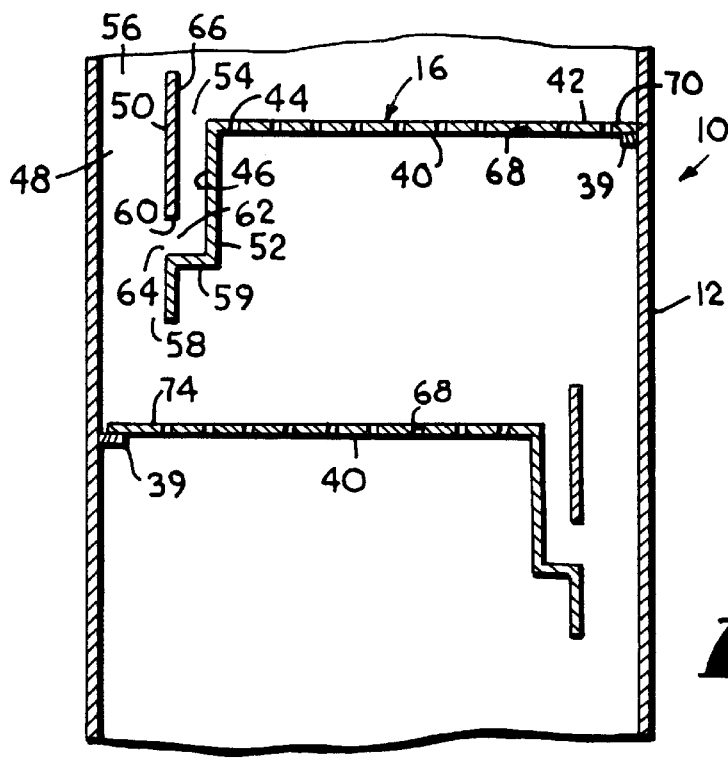
FIG. 3 is a fragmentary side elevation view of the column taken in vertical section to show a first embodiment of the vapor-liquid contact trays.

Referring now to the drawings in greater detail and initially to FIG. 1, a mass transfer or heat exchange column is designated generally by the numeral 10 and includes an upright cylindrical shell 12 which defines an open interior region 14 in which a plurality of vapor-liquid contact trays 16 are contained. Column 10 is of a type used for processing liquid and vapor streams, including to obtain fractionation products. Although column 10 is shown in a cylindrical configuration, other shapes, including polygonal, may be used. The column 10 can be of any suitable diameter and height and can be constructed from suitable rigid materials.

One or more liquid streams can be directed to the column 10 in a conventional manner through side stream feed line 18 and overhead reflux return line 20. Likewise, one or more vapor streams can be charged to the column through side stream feed line 22 or can be generated within the column. In addition to trays 16, internals such as beds of packing 24 and 26 and liquid distributors 28, 29 and 30 and collector 31 can be located within the column to carry out the desired processing of the liquid and vapor streams as they flow in countercurrent relationship through the column 10. Vapor product is removed from the top of column 10 through overhead removal line 32 and liquid product is removed as a bottoms through removal line 34. Liquid can also be removed at an intermediate portion of column through side stream drawn off line 36. A plurality of manways 38 extend through the column shell 12 to facilitate installation and removal of internal column components. Other appropriate system components such as reboilers, condensers and the like are not illustrated because of their conventional nature.

Figure 4:
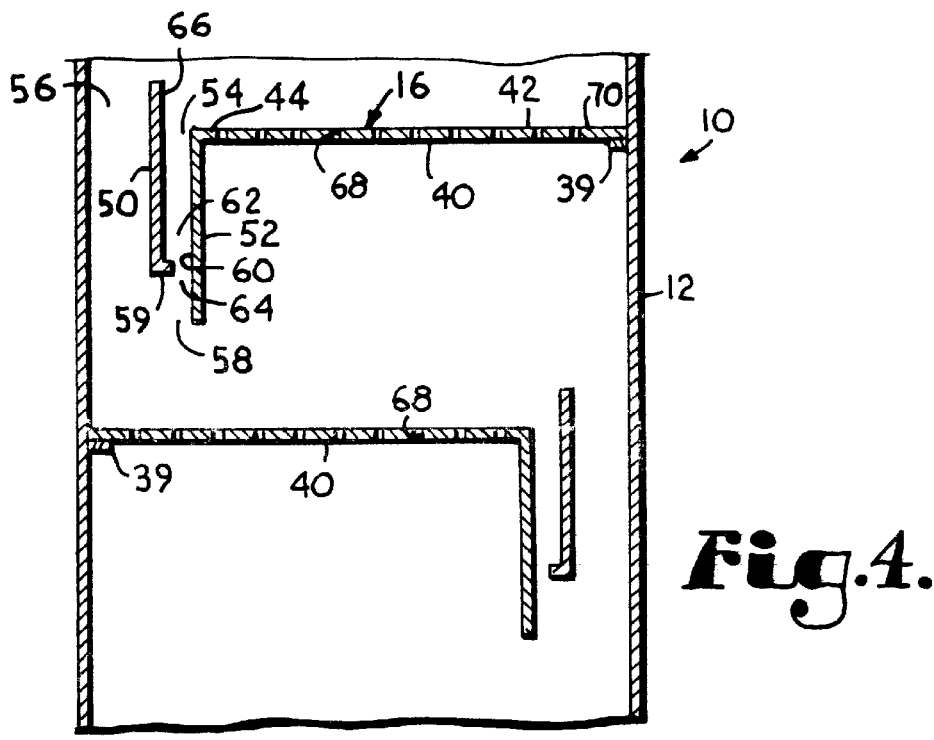
FIG. 4 is a fragmentary side elevation view of the column taken in vertical section to show a second embodiment of the vapor-liquid contact trays.

Turning additionally to FIGS. 2–4, the vapor-liquid contact trays 16 of the present invention are positioned in the interior region 14 of column 10 and are placed in vertically spaced apart relationship. The trays 16 are generally horizontally disposed and are supported on rings 39 mounted on the inner surface of the column shell 12. Each tray 16 comprises a tray deck 40 having an inlet end 42 where liquid is introduced onto the tray deck 40 and an outlet end 44 where liquid is removed from the tray deck through an opening 45 in the tray deck 40.

At least one tray 16 includes an upstream downcomer 46 positioned in the opening 45 at the outlet end 44 of the tray deck 40 and a downstream downcomer 48 positioned adjacent to and downstream from the upstream downcomer 46 in the tray deck opening 45. The downcomers 46 and 48 extend downwardly below the tray deck a preselected distance toward the underlying tray. The upstream downcomer 46 preferably has a shorter length than the downstream downcomer 48 to reduce interference with the vapor flow from the underlying tray, but the downcomers may be the same length if desired. A partition wall 50 formed of a liquid impermeable material separates the upstream and downstream downcomers 46 and 48 along at least a portion of their lengths. The partition wall 50 preferably is a single wall that serves as a common wall for both downcomers 46 and 48. Alternatively, the partition wall 50 can be a double, spaced apart wall that permits the downcomers to be spaced apart if desired. The upstream downcomer is also formed in part by an inlet wall 52 which can be planar and vertically positioned as illustrated, or can be sloped, and/or curved, multi-segmented chordal, or other desired configuration. Some or all of the remaining walls of the downcomers can be formed by the column shell 12.

The upstream and downstream downcomers cooperate to remove liquid from the outlet end 44 of the tray deck and direct it downwardly to the inlet end 42 of the underlying tray deck. Both downcomers 46 and 48 have an upper inlet 54 and 56, respectively, through which liquid enters the open top of the downcomer for downward passage therethrough and the downstream downcomer 48 has a discharge outlet 58 through which liquid is discharged onto the inlet end 42 of the underlying tray deck 40. In accordance with the present invention, the upstream downcomer 46 discharges part or all of the liquid contained therein into the downstream downcomer 48 rather than directly onto the underlying tray deck. The discharge of some or all of the liquid from the upstream downcomer 46 into the downstream downcomer 48 can be accomplished in any suitable fashion. In the tray embodiment illustrated in FIG. 3, the bottom of the upstream downcomer is closed by bottom plate 59 and the partition wall 50 has an opening 60 that forms a lower discharge outlet 62 for the upstream downcomer 46 and also serves as an intermediate inlet 64 for the downstream downcomer 48. Liquid exiting the upstream downcomer through the discharge outlet 62 is thus fed directly into the inlet 56 of the downstream downcomer. The opening 60 can be in the form of round, oval or otherwise shaped holes, one or more elongated slots, or can simply be formed by terminating the partition wall 50 short of the bottom plate 59. The bottom plate 59 can either be liquid impermeable to force all of the liquid from the upstream downcomer to flow into the downstream downcomer or can be liquid permeable to allow some of the liquid to be discharged through the bottom plate 59. Suitable openings can be provided in the bottom plate 59 to provide the desired amount of liquid permeability.

In the tray embodiment illustrated in FIG. 4, the upstream downcomer 46 is formed integrally with, and is shorter than, the downstream downcomer 48. The opening 60 forming the discharge outlet 62 for the upstream downcomer and the inlet 64 for the downstream downcomer is formed in the bottom plate 59 rather than the partition wall 50. Liquid exiting the discharge outlet 62 flows into that portion of the downstream downcomer 48 that underlies the bottom plate 59 of the shorter upstream downcomer 46. In this embodiment, as well as the embodiment shown in FIG. 3 it may be particularly desirable to reduce the horizontal cross-sectional area of the downstream downcomer discharge outlet 58 such as by closing the outlet with a perforated plate and/or sloping at least the lower portion of the inlet wall 52 in a known manner.

A weir 66 is provided at the outlet end 44 of the tray deck 40 to cause liquid to accumulate to a preselected depth on the tray deck 40 before it overflows the weir 66 and enters the inlet of the associated downcomer. The weir 66 preferably separates the inlets 54 and 56 to the upstream and downstream downcomers 46 and 48, respectively, and may be formed as a vertical extension of the partition wall 50. When positioned in this manner, the weir 66 causes liquid to fill the upstream downcomer and accumulate on the tray deck 40 to a preselected depth before it spills over the weir 66 and enters the inlet 56 of the downstream downcomer. Alternatively, the weir 66 may be omitted altogether or positioned at the edge of the outlet end 44 of the deck 40 so that liquid must spill over the weir 66 to enter the inlet 54 of the upstream downcomer 46.

The tray deck 40 also includes a plurality of apertures 68 uniformly distributed across the portion of the tray deck known as the "active area." The apertures 68 permit vapor to pass through the tray deck 40 and interact with liquid flowing across the upper surface of the deck. The apertures 68 have a size, shape and distribution selected for the particular operating conditions in which the tray 16 will be utilized. The tray deck 40 includes a liquid receiving area 70 at the inlet end 42 which does not contain apertures 68 because it receives the liquid from the discharge outlet 58 of the downstream downcomer 48.

Turning now more particularly to FIG. 2, the method of using the trays 16 to cause mass transfer between the vapor and liquid streams will be described in more detail. Liquid flows across the active area of the tray from the inlet end 42 to the outlet end 44 and intermixes with vapor 72 flowing through apertures 68 to form a frothy, two-phase mixture 74 above the tray deck 40. Most of the vapor 72 disengages from this two-phase mixture 74 and passes upwardly through the apertures 68 in the overlying tray. Some of the vapor, however, remains mixed with the liquid entering the upstream downcomer 46. Because the liquid accumulates within the upstream downcomer, vapor more readily disengages from the liquid in the upstream downcomer than from the liquid which has spilled over the weir 66 and is traveling downwardly through the downstream downcomer. The liquid discharged from the upstream downcomer 46 into the lower portion of the downstream downcomer 48 has thus been degassed to a substantially greater extent than the liquid that has entered the downstream downcomer through the top inlet 56. As a result, the upstream downcomer increases the liquid handling capacity of the downcomer by removing gas in the upper regions of the downcomer. The liquid is then discharged from the downstream downcomer 48 through the discharge outlet 58 onto the liquid receiving area 70 of the underlying tray.

Because the upstream downcomer 46 feeds liquid into the downstream downcomer 48 to seal against vapor entry into the discharge outlet 58, an important feature of the present invention is the ability to locate the discharge outlet 58 above the height of the weir 66 or the accumulated liquid on the underlying tray. This increases the downcomer clearance and allows the downstream downcomer 48 to have greater liquid handling capacity because the liquid is being discharged above the effective level of liquid on the underlying tray. In other applications, however, the discharge outlet 58 can be located below the weir 66 height or the level of accumulated liquid on the underlying tray. Notably, because the upstream downcomer discharge outlet 62 does not discharge liquid directly onto the tray deck 40, the area of the tray deck 40 underlying the upstream downcomer 46 can contain vapor flow apertures, such as illustrated in FIG. 3. This permits the active area of the tray 16 to be increased with resulting increases in mass transfer efficiency.

Although the invention has been described with respect to a tray of a type known as a "single-pass" tray because the liquid flows as a single stream across the tray deck, the invention also applies to multiple-pass trays on which two or more streams flow into one or more downcomers. For example, in a two-pass tray a downcomer is positioned in the center of one tray and two downcomers are placed at opposite ends of the underlying tray. The liquid stream exiting the center downcomer is split into two streams that flow in opposite directions to the end downcomers on the underlying tray. The two streams are then conveyed downwardly to the next underlying tray and flow toward the center downcomer. The two-stage downcomer of the present invention can be used in the manner described above for the end downcomers and can readily adapted for use as the center downcomer by combining two two-stage downcomers. Alternatively, the two-stage downcomer can be modified for use as the center downcomer by placing two upstream downcomers on opposite sides of a single downstream downcomer. Other modifications can be made to the two-stage downcomer described above and remain within the scope of the present invention.

It will of course be appreciated that the downcomer of the present invention can be used in combination with other features such as a raised liquid receiving area and/or louvres or other vapor flow apertures designed to limit liquid weeping while permitting vapor flow through the liquid receiving area.

From the foregoing, it will be seen that this invention is one well adapted to attain all the ends and objects hereinabove set forth together with other advantages that are inherent to the structure.

It will be understood that certain features and subcombinations are of utility and may be employed without reference to other features and subcombinations. This is contemplated by and is within the scope of the claims.

Having thus described the invention, what is claimed is:

1. A vapor-liquid contact tray comprising:
    a tray deck having an opening for removing liquid from an upper surface of the tray deck and a plurality of apertures for allowing vapor to flow upwardly through the tray deck;
    an upstream downcomer extending downwardly at said opening in the tray deck and having an upper inlet to receive at least a portion of the liquid entering said opening from the tray deck and a lower discharge outlet through which liquid exits the upstream downcomer;
    a downstream downcomer extending downwardly at said opening in the tray deck and having a lower discharge outlet through which liquid exits the downstream downcomer;
    a liquid impermeable partition wall separating said downstream downcomer from said upstream downcomer along at least a portion of the length of said downstream and upstream downcomers;
    an opening in the partition wall which forms both an intermediately positioned inlet into the downstream downcomer and the discharge outlet of the upstream downcomer,
    wherein said discharge outlet of the upstream downcomer is in fluid flow communication with the downstream downcomer to feed substantially all of the liquid exiting the upstream downcomer into the downstream downcomer; and
    an upper inlet in the downstream downcomer positioned to receive another portion of the liquid entering said opening from the tray deck.

2. The vapor-liquid contact tray as in claim 1, including a weir positioned at said opening in the tray deck and separating the upper inlet of the downstream downcomer from the upper inlet of the upstream downcomer.

3. The vapor-liquid contact tray as in claim 1, wherein the downstream downcomer is of a greater length than the upstream downcomer.

4. A mass transfer column comprising an external shell defining an open internal region and a plurality of vapor-liquid contact trays supported in the open internal region, at least one of the vapor-liquid contact trays comprising:
    a tray deck having an opening for removing liquid from an upper surface of the tray deck and a plurality of apertures for allowing vapor to flow upwardly through the tray deck;
    an upstream downcomer extending downwardly at said opening in the tray deck and having an upper inlet to receive at least a portion of the liquid entering said opening from the tray deck and a lower discharge outlet through which liquid exits the upstream downcomer;
    a downstream downcomer extending downwardly at said opening in the tray deck and having a lower discharge outlet through which liquid exits the downstream downcomer and is directed onto an underlying vapor-liquid contact tray;
    a liquid impermeable partition wall separating said downstream downcomer from said upstream downcomer along at least a portion of the length of said downstream and upstream downcomers;
    an opening in the partition wall which forms both an intermediate inlet into the downstream downcomer and the discharge outlet of the upstream downcomer,
    wherein said discharge outlet of the upstream downcomer is in fluid flow communication with the downstream downcomer to feed substantially all of the liquid exiting the upstream downcomer into the downstream downcomer; and
    an upper inlet in the downstream downcomer positioned to receive another portion of the liquid entering said opening from the at least one tray deck during operation of the column.

5. The mass transfer column as in claim 4, including a weir positioned at said opening in the at least one tray deck and separating the upper inlet of the downstream downcomer from the upper inlet of the upstream downcomer.

6. The mass transfer column as in claim 4, wherein the downstream downcomer is of a greater length than the upstream downcomer.

7. The mass transfer column as in claim 4, wherein the discharge outlet of the downstream downcomer on said at least one tray is positioned above the level of the top of a weir on a next underlying tray.

8. The mass transfer column as in claim 4, wherein the discharge outlet of the downstream downcomer on said at least one tray is positioned below the level of the top of a weir on a next underlying tray.

9. A method of intermixing vapor and liquid streams in a mass transfer column containing a plurality of vertically spaced vapor-liquid contact trays, each tray having a tray deck containing apertures and an upstream downcomer and a downstream downcomer positioned at an opening in the tray deck and separated by a partition wall along at least a portion of their lengths, said method comprising the steps of:

(a) flowing a liquid stream across the tray deck of one of the trays toward said opening;

(b) directing at least part of the liquid stream into an inlet in the upstream downcomer at the opening and passing said part of the liquid stream downwardly through the upstream downcomer with the partition wall blocking said part of the liquid stream from flowing through the partition wall into the downstream downcomer;

(c) discharging substantially all of said part of the liquid stream from the upstream downcomer into said downstream downcomer through at least one opening in the partition wall for further downward passage and then discharging said portion from the downstream downcomer onto an underlying tray;

(d) repeating steps (a) through (c) on said underlying tray; and (e) passing a vapor stream upwardly through said apertures in the tray decks and interacting the vapor stream with the liquid stream on said tray decks.

10. The method as set forth in claim 9, including directing another part of said liquid stream into an inlet in the downstream downcomer at the opening.

11. The method as set forth in claim 9, including filling said upstream downcomer to cause another part of said liquid stream to enter an inlet in the downstream downcomer at the opening.

12. The method as set forth in claim 11, including causing said liquid stream to accumulate on said tray deck by placing a weir at said opening between the inlet for the upstream downcomer and the inlet for the downstream downcomer.

13. The method as set forth in claim 9, including causing said liquid stream to accumulate on said tray deck by placing a weir at said opening.

14. The method as set forth in claim 9, wherein vapor is entrained in said liquid upstream and wherein said part of the liquid stream directed into the upstream downcomer accumulates within the upstream downcomer and causes at least a portion of said vapor to disengage from said part of the liquid stream.

15. The method as set forth in claim 9, including accumulating liquid on the underlying tray to a preselected height and wherein said liquid is discharged from said downstream downcomer through a discharge outlet positioned above the height of accumulated liquid on the underlying tray.

16. The method as set forth in claim 15, including discharging said liquid from the downstream downcomer discharge outlet onto an inlet area of the underlying tray which is substantially free of said apertures.

17. The method as set forth in claim 9, including accumulating liquid on the underlying tray to a preselected height and wherein said liquid is discharged from said downstream downcomer through a discharge outlet positioned below the height of accumulated liquid on the underlying tray.

* * * * *